(12) United States Patent (10) Patent No.: US 12,698,756 B2

Khokhar et al. (45) Date of Patent: Aug. 4, 2026

---

(54) METHOD OF OPERATING A WIND TURBINE

(71) Applicant: Siemens Gamesa Renewable Energy A/S, Brande (DK)

(72) Inventors: Malik Ali Zaib Khokhar, Aalborg (DK); Xavier Vives Jaume, Brande (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 817 days.

(21) Appl. No.: 17/918,963

(22) PCT Filed: Apr. 21, 2021

(86) PCT No.: PCT/EP2021/060414
§ 371 (c)(1),
(2) Date: Oct. 14, 2022

(87) PCT Pub. No.: WO2021/214152
PCT Pub. Date: Oct. 28, 2021

(65) Prior Publication Data
US 2023/0272774 A1      Aug. 31, 2023

(30) Foreign Application Priority Data

Apr. 23, 2020    (EP) ..................................... 20171048

(51) Int. Cl.
*F03D 7/04*      (2006.01)
*F03D 9/25*      (2016.01)
(Continued)

(52) U.S. Cl.
CPC .............. *F03D 7/048* (2013.01); *F03D 9/25* (2016.05); *H02P 9/008* (2013.01); *F05B 2270/20* (2013.01); *H02P 2101/15* (2015.01)

(58) Field of Classification Search
CPC . F03D 7/048; H02P 2101/15; G05B 23/0283; G05B 2219/2619; Y02E 10/72
(Continued)

(56) References Cited

U.S. PATENT DOCUMENTS

| | | | | |
|---|---|---|---|---|
| 7,805,205 | B2 * | 9/2010 | Santos | .................. F03D 7/0292 |
| | | | | 700/32 |
| 7,883,317 | B2 * | 2/2011 | Ormel | ..................... F03D 7/046 |
| | | | | 416/61 |

(Continued)

FOREIGN PATENT DOCUMENTS

| | | |
|---|---|---|
| CN | 106065848 A | 11/2016 |
| CN | 108869173 A | 11/2018 |

(Continued)

OTHER PUBLICATIONS

Siemens. (Nov. 7, 2016). Siemens renews Washington ties. Retrieved May 31, 2025, from https://renews.biz/40061/siemens-renews-washington-ties/ (Year: 2016).*

(Continued)

*Primary Examiner* — Robert E Fennema
*Assistant Examiner* — Vi N Tran
(74) *Attorney, Agent, or Firm* — Schmeiser Olsen PLLC

(57)      ABSTRACT

A method of operating a wind turbine is provided. A controller is configured to activate or deactivate each of two or more distinct control features, each control feature changing the operating characteristic of the wind turbine and having an impact on at least one of lifetime and energy production. The method includes determining a type of optimization parameter and an optimization target for the optimization parameter, wherein the optimization parameter is related to at least one of lifetime or energy production of the wind turbine. The method further performs one or more optimization steps, wherein each optimization step is per- (Continued)

formed for a different combination of activation states of the two or more control features. Based on the one or more optimization steps, an optimal combination of activation states of the two or more control features for which the estimated optimization parameter achieves the optimization target is determined.

17 Claims, 4 Drawing Sheets

(51) Int. Cl.
  *H02P 9/00* (2006.01)
  *H02P 101/15* (2016.01)
(58) Field of Classification Search
  USPC .......................................................... 700/286
  See application file for complete search history.

(56) References Cited

U.S. PATENT DOCUMENTS

| | | | | |
|---|---|---|---|---|
| 8,215,896 | B2 * | 7/2012 | Kooijman | F03D 7/0224 |
| | | | | 415/118 |
| 8,633,607 | B2 | 1/2014 | Egedal et al. | |
| 8,649,911 | B2 | 2/2014 | Avagliano et al. | |
| 9,035,479 | B1 | 5/2015 | Gates | |
| 9,217,416 | B2 * | 12/2015 | Spruce | G05B 13/048 |
| 9,816,483 | B2 | 11/2017 | Nakamura et al. | |
| 2008/0086281 | A1 * | 4/2008 | Santos | F03D 7/0292 |
| | | | | 700/32 |
| 2013/0161949 | A1 | 6/2013 | Egedal et al. | |
| 2014/0142888 | A1 * | 5/2014 | Duncan | F03D 7/0296 |
| | | | | 702/150 |
| 2015/0167637 | A1 | 6/2015 | Kooijman et al. | |
| 2015/0275860 | A1 | 10/2015 | Carcangiu et al. | |
| 2015/0308413 | A1 | 10/2015 | Bhaskar et al. | |
| 2016/0305404 | A1 | 10/2016 | Esbensen | |
| 2017/0089325 | A1 | 3/2017 | Timbus et al. | |
| 2017/0328346 | A1 | 11/2017 | Hales et al. | |
| 2018/0163697 | A1 | 6/2018 | Danielsen et al. | |
| 2018/0187649 | A1 * | 7/2018 | Spruce | F03D 9/257 |
| 2019/0137956 | A1 * | 5/2019 | Hooshmand | G05B 13/042 |
| 2020/0141392 | A1 * | 5/2020 | Damgaard | F03D 17/00 |
| 2020/0347824 | A1 | 11/2020 | Yu | |
| 2021/0123416 | A1 | 4/2021 | Vestergaard et al. | |

FOREIGN PATENT DOCUMENTS

| | | | |
|---|---|---|---|
| EP | 2192456 | B1 | 6/2010 |
| EP | 2541052 | B1 | 4/2014 |
| EP | 2766600 | B1 | 8/2014 |
| JP | 2016217133 | A | 12/2016 |
| WO | 2018065670 | A1 | 4/2018 |
| WO | 2019148775 | A1 | 8/2019 |
| WO | WO 2019214785 | A1 | 11/2019 |

OTHER PUBLICATIONS

Castellani, Francesco, et al. "Mechanical behaviour of wind turbines operating above design conditions." Procedia Structural Integrity 24 (2019): 495-509. (Year: 2019).*
Sorensen, Poul Ejnar. "Wind power variability and power system reserve requirements at 2020 at 2030 scenarios for offshore wind power in Northern Europe." Danish Wind Power Research 2013. (Year: 2013).*
Mayda, Edward, et al. "Wind Turbine Rotor R&D—An OEM Perspective." Proceedings of the International Conference on Future Technologies for Wind Energy, Laramie, WY, USA. 2013. (Year: 2013).*

* cited by examiner

FIG 5

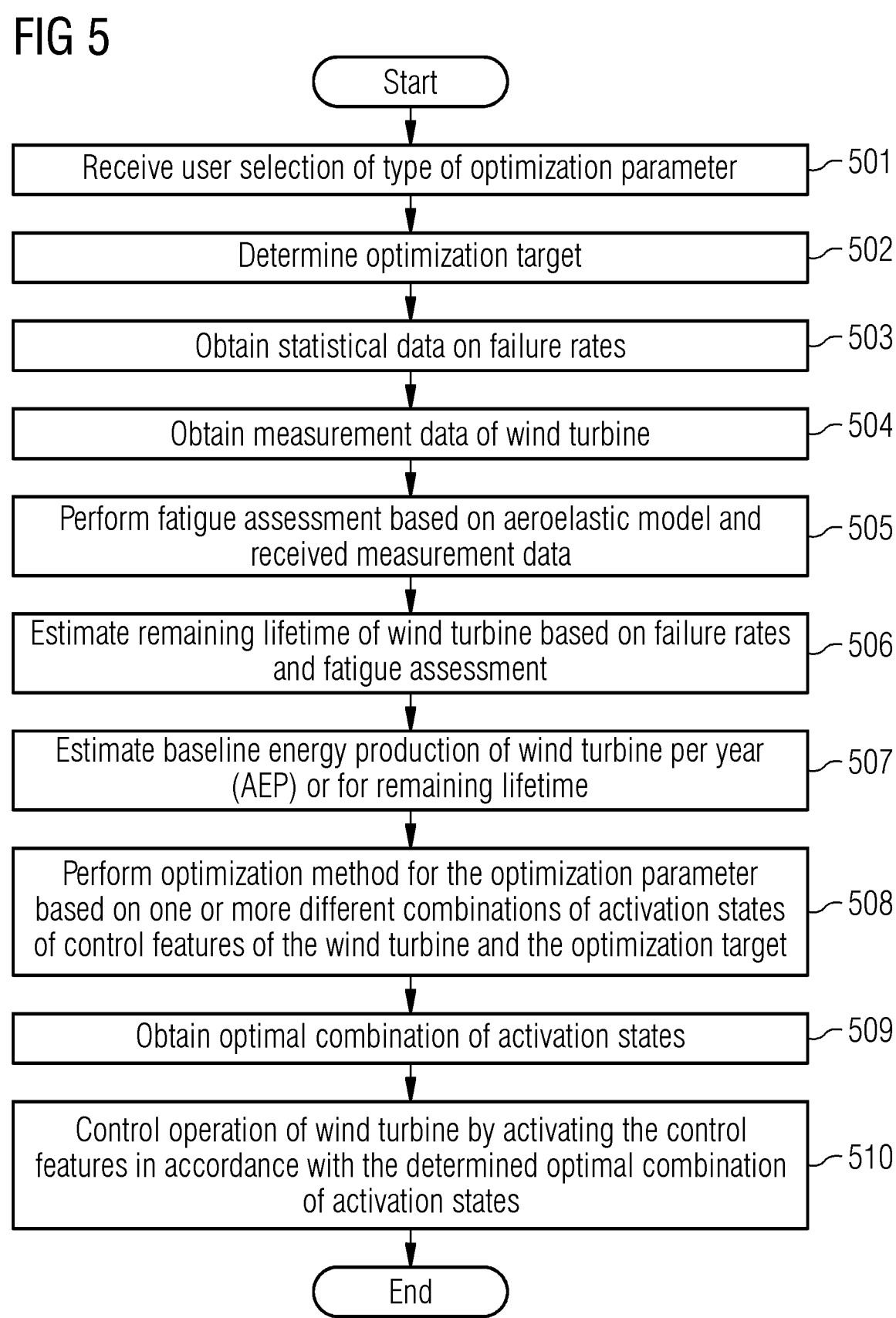

Start

Receive user selection of type of optimization parameter — 501

Determine optimization target — 502

Obtain statistical data on failure rates — 503

Obtain measurement data of wind turbine — 504

Perform fatigue assessment based on aeroelastic model and received measurement data — 505

Estimate remaining lifetime of wind turbine based on failure rates and fatigue assessment — 506

Estimate baseline energy production of wind turbine per year (AEP) or for remaining lifetime — 507

Perform optimization method for the optimization parameter based on one or more different combinations of activation states of control features of the wind turbine and the optimization target — 508

Obtain optimal combination of activation states — 509

Control operation of wind turbine by activating the control features in accordance with the determined optimal combination of activation states — 510

End

METHOD OF OPERATING A WIND TURBINE

CROSS-REFERENCE TO RELATED APPLICATIONS

This application claims priority to PCT Application No. PCT/EP2021/060414, having a filing date of Apr. 21, 2021, which claims priority to EP Application Serial No. 20171048.0, having a filing date of Apr. 23, 2020, the entire contents both of which are hereby incorporated by reference.

FIELD OF TECHNOLOGY

The following relates to a method of operating a wind turbine using a controller, wherein the controller can activate or deactivate distinct control features of the wind turbine. The following further relates to a respective controller and to a computer program.

BACKGROUND

The use of wind energy is proliferating. Wind turbines are being installed at different locations throughout the world and are thus exposed to different environmental conditions. Wind turbines must withstand considerable wind forces that act on the rotor, the nacelle and the tower of the wind turbine. During their lifetime, the structural components of the wind turbine are exposed to a number of load cycles that can eventually lead to failure of the component. Structural failure of such wind turbine components is generally assessed through a physical inspection of these components. It is furthermore known to perform a fatigue assessment of a wind turbine based on an aeroelastic model.

Modern wind turbines are furthermore equipped with plural control features that can improve the operation of the wind turbine. An example of such control features is a high wind ride-through (HWRT) control feature according to which the rotor speed and the power output of the wind turbine is reduced with increasing wind speeds in order to prevent the shutdown of the wind turbine, which is usually performed when wind speeds exceed a certain limit over a certain time. Another exemplary control function is a power boost (PB) function which can increase the energy production from a wind turbine by temporarily increasing the power limit of the wind turbine under certain conditions. Another control feature is for example the adaptive control system (ACS) that performs load management in real-time based on measured data, and that in particular reduces the power output of the wind turbine if increased turbulences are measured at the wind turbine.

It is desirable to operate such wind turbine in a way that efficiently achieves the operating characteristics desired by the operator. For example, the operator may have the desire to operate the wind turbine such that the wind turbine achieves a maximum lifetime. A different operator may have the desire to operate the wind turbine such that the energy production is maximized.

Operators are generally faced with the problem that due to the different environmental conditions, the different types of wind turbines and their different properties, as well as the different available control schemes do not allow the operator to easily set up an operating scheme for the wind turbines that leads to the desired result.

From document US 2013/0161949 A1, it is for example known to consider the fatigue load for operating a wind turbine. The operating ranges of different wind turbines are adjusted such that each wind turbine operates in a range in which the fatigue load does not have a maximum. The mean lifetime of the wind turbines may thereby be improved.

The document WO 2019/214785 A1 describes a method in which a model is used to obtain a modelled fatigue value for a wind turbine. The modelled fatigue value is compared to an expected fatigue value to identify an opportunity to modify the control strategy of the wind turbine. It is however not described how the control strategy needs to be modified to lead to a desired result.

SUMMARY

An aspect relates to improving the operation of wind turbines, and in particular to operating the turbines in such way that an operating target, such as maximum lifetime or maximum energy production, is achieved by the operation.

In an embodiment of the present invention, a method of operating a wind turbine using a controller is provided. The controller is configured to activate or deactivate each of two or more control features of the wind turbine. Each control feature changes the operating characteristic of the wind turbine and has an impact on lifetime and energy production of the wind turbine. According to embodiments of the method, a type of optimization parameter and an optimization target for the optimization parameter are determined. The optimization parameter is related to at least one of lifetime or energy production of the wind turbine. One or more optimization steps (e.g., 1, 2, 3 or more) are performed, wherein each optimization step is performed for a different combination of activation states of the two or more control features. Each optimization step includes selecting a combination of activation states of the two or more control features; estimating the optimization parameter based on an estimation of the remaining lifetime and/or energy production (e.g. per year or over the remaining lifetime) of the wind turbine, wherein the estimating considers the impact of the control features activated in the optimization step; and based on the estimated optimization parameter, determining if a further optimization step is to be performed. In embodiments, the method further comprises, based on the one or more optimization steps, determining a combination of activation states of the two or more control features for which the estimated optimization parameter best meets (i.e., achieves) the optimization target, e.g., is above a target threshold or is closest to the optimization target. This determined combination of activation states is considered to be the optimal combination of activation states.

By such method, a control strategy for the selected optimization parameter may thereby be obtained in an efficient way. In particular, such control strategy in form of the optimal combination of activation states can be automatically obtained by the controller. The operator may only select the type of optimization parameter (and the optimization target if that is not implied in the selected optimization parameter), and the controller can responsive thereto efficiently and automatically select the control strategy and perform the respective control of the wind turbine. It should be clear that the optimization parameter can also be based on a combination of lifetime and energy production. The method thereby estimates the optimization parameter under consideration of the impact of the activated/deactivated control features (i.e., the combination of activation states), resulting in a precise estimation of the performance and failure risk of the wind turbine. The impact of all possible control features can thus be evaluated together and automatically.

So far, an optimization of lifetime and energy production was discussed. A third optimization target, which can be used instead or additionally to lifetime and/or energy production, is a power demand satisfaction for a power demand from a power grid to which the wind turbine is connected. As said, the controller may be configured to activate or deactivate each of two or more control features of the wind turbine. Each control feature changes the operating characteristic of the wind turbine and has an impact on lifetime and energy production of the wind turbine, but also how good the expected future power demand will be met. For example, if the power demand is expected to be high at specific days of weeks then the optimization process may increase the production for these days and reduce it for other days to be able to satisfy the power demand, e.g., avoiding over production. Each optimization step may include selecting a combination of activation states of the two or more control features; estimating the optimization parameter based on an estimation of the remaining lifetime and/or energy production of the wind turbine and/or an estimation of future power demand and according estimated operation of the wind turbine to satisfy this demand. The estimating considers the impact of the control features activated in the optimization step. Based on the estimated optimization parameter, it is determined if a further optimization step is to be performed. In embodiments, the method further comprises, based on the one or more optimization steps, determining a combination of activation states of the two or more control features for which the estimated optimization parameter best meets (i.e., achieves) the optimization target, e.g., is above a target threshold or is closest to the optimization target. This determined combination of activation states is considered to be the optimal combination of activation states.

The power demand satisfaction, i.e., whether a wind turbine can satisfy the demand of a power grid operator, may guarantee that the power grid will be operated in a stable manner. This again will guarantee that the wind turbine will not run into instable operation modes, like low voltage ride through operation. As a side effect the revenue for the wind turbine may be optimized as the grid operator usually offers different energy prices based on the expected demand and supply on the power grid.

Estimating the optimization parameter for example includes (or is performed by) estimating at least the remaining lifetime if the optimization parameter is related to (or is) the remaining lifetime of the wind turbine, and includes (or is performed by) estimating at least the energy production of the wind turbine if the optimization parameter is related to (or is) the energy production of the wind turbine or the power demand satisfaction for a power demand from a power grid to which the wind turbine is connected. It may certainly include estimating both, the remaining lifetime and the energy production of the wind turbine.

If a further optimization step is to be performed, the method may select a different combination of activation states for the available control features and re-estimate the optimization parameter with such combination. It may be determined that no further optimization step is to be performed if the estimated optimization parameter meets the target, e.g. exceeds a threshold for an increase in lifetime/energy production, or if a stop condition of a search or optimization algorithm implemented by two or more of the optimization steps is reached, e.g. after the optimization parameter has been estimated for each possible combination of activation states, so that the combination resulting in a optimization parameter best meeting the target can be determined. It should be clear that the controller may implement a control unit performing the control of the wind turbine and a strategy optimization unit/optimizer that determines the control strategy, in particular the respective optimal combination of activation states. These units can be implemented in the same physical unit, e.g., a wind turbine controller, or in physically separate units.

In an embodiment, the determining of the type of optimization parameter comprises receiving a user input for selecting the type of optimization parameter from at least two types of possible optimization parameters. The type of optimization parameter may for example be selected from at least two types of possible optimization parameters that include energy production (yearly or remaining) and remaining lifetime. Other types of optimization parameters are certainly conceivable, such as power demand satisfaction for a power demand from a power grid to which the wind turbine is connected or 'useful energy production', which is related to a combination of lifetime and energy production. When using the useful energy production as an optimization parameter, an external parameter, such as power demand on the grid, may additionally be considered. For example, when power demand is high (e.g., above a predetermined threshold), the energy production of the wind turbine may be maximized and when power demand is low (e.g., below such threshold), lifetime may be maximized. It should be clear that the method may be performed repeatedly during operation of the wind turbine, so that the control strategy can be adapted during operation, for example when the external parameter changes, e.g., the power demand rises or falls. It should be clear that also in this case, the type of optimization parameter (useful energy production) has to be selected only once, and that the method thereafter automatically derives the optimum control strategy, additionally considering the external parameter.

For these exemplary optimization parameters, the optimization target is generally a maximization or the achieving an optimization parameter above a threshold, yet for other optimization parameters, it may be a minimization or an optimization parameter that falls below a threshold. As an example, a type of optimization parameter may be remaining lifetime, and the optimization target may be a maximization of the remaining lifetime or a remaining lifetime/lifetime increase above a threshold. As another example, the optimization parameter may be a fatigue load and the optimization target may be a minimization thereof, responsive to which the controller selects the combination of control feature that results in the smallest estimated fatigue load. The controller automatically determines and selects the feature combination that achieves the optimization target.

The optimization target may be associated with the selectable types of optimization parameters (e.g, the parameter energy production may be associated with the target 'maximization'), it may be determined by the controller based on the selected type of optimization parameter (e.g. a threshold based on predetermined expected changes to lifetime and/or energy production associated with the available control features), or it may be determined by user input. The selection of the combination of activation states of the two or more control features in each optimization step may be based on a predefined impact of the two or more control features on lifetime and/or energy production of the wind turbine. Such predefined impact may be associated with the available control features and may be stored by or accessible to the controller, e.g., in a memory of the controller or a database. Such predefined impact may be based on empirical data for the respective control feature and may not correspond to the real impact that the control feature has in combination with further control features. The real impact may rather be determined in the estimation of the optimization parameter, in which the activation states of other control features are considered. For example, when performing a lifetime maximization, the selected combination may include an activation of all features having a positive impact on lifetime, and if such combination does not achieve the desired result, the combination of activation states is changed in the next step, e.g., by subsequently deactivating features having only a limited impact on lifetime.

Determining if a further optimization step is to be performed may comprise evaluating one or more boundary conditions (or stop criteria), in particular for operating parameters other than the optimization parameter, wherein, in some embodiments, evaluating a boundary condition may comprise determining if the change in lifetime and/or energy production of the wind turbine caused by the activation of the control features in accordance with the respective combination of activation states exceeds a respective threshold. The threshold may for example be exceeded if the reduction in lifetime is too high, or if the reduction in energy production is too high. A boundary condition may also be evaluated by determining if the total remaining lifetime exceeds a predetermined time period threshold (e.g., if the total remaining lifetime drops below such threshold, the boundary condition may not be met). Such fixed time period threshold for the remaining lifetime can for example be a minimum absolute value for the remaining lifetime. If such threshold of the boundary condition is exceeded, a further optimization step with a different feature combination is performed. This has the advantage that it can be ensured that the resulting combination of activation states not only reaches the optimization target, but also has an acceptable impact on the remaining operating parameters. A threshold for a boundary condition may be predefined (e.g., max. 10% drop in annual energy production) or may be provided by user input. If the one or more boundary conditions are met when the optimization target is reached, the resulting combination of activation states is taken as the optimal combination. A combination of activation states for which the one or more boundary conditions are not met may not be taken as an optimal combination, such combination may rather be excluded. If no combination meeting the optimization target and the boundary conditions is found, the optimization target may be adjusted and/or the boundary conditions may be relaxed.

Performing the one or more optimization steps may include the performing of a search algorithm or optimization algorithm for finding the combination of activation states that results in an optimization parameter best meeting the optimization target, wherein the combination of activation states found by the algorithm is selected as the optimal combination of activation states. Such search algorithm may for example subsequently activate further control features having an impact on the optimization parameter, and the search may be stopped if a stop criterion is met, e.g., if the estimated optimization parameter exceeds a threshold set by the optimization target. As outlined above, unless boundary conditions can be evaluated and if they are not met, the search is continued until a result is found that meets these conditions. Using such algorithm, the optimal combination of activation states may be found in a fast and efficient way, in particular as not all possible combinations need to be evaluated.

If no optimal combination of activation states that meets the boundary conditions is found, the operator may be requested to adjust the optimization target or the boundary conditions. In an embodiment, an optimization step may be performed for each possible combination of the activation states of the two or more control features. The combination of activation states for which the respective optimization step results in the optimization parameter best complying with (or meeting) the optimization target, and for which possible boundary conditions are fulfilled, may then be selected as the optimal combination of activation states. Using such method, it can be ensured that the impact of all possible combinations of control features is considered in the assessment and that a control strategy is obtained that results in the optimization parameter best meeting the optimization target.

The optimization steps and the determining of the optimal combination of activation states may be performed repeatedly during the operation of the wind turbine. The operation of the wind turbine may then be adjusted in accordance with the respectively determined optimal combination of activation states of the two or more control features. In this way, it may be ensured that when the conditions for the assessment change, which may be determined by feedback from a condition-monitoring system of the wind turbine, the operating strategy can be updated to operate the wind turbine such that it achieves the best possible optimization parameter.

The method may be performed individually for the wind turbine, i.e., it may be performed individually for each wind turbine of a wind farm. Accordingly, each wind turbine of the wind farm can be operated so as to achieve the best possible optimization parameter in view of the optimization target. It should be clear that different types of optimization parameters may be set for different wind turbines, i.e., operation of one wind turbine may maximize lifetime while operation of another wind turbine may maximize energy production.

In an embodiment, the two or more control features comprise at least two or all of the control features selected from the group consisting of or comprising: a high wind ride-through (HWRT) control feature that performs a load based reduction of the output power of the wind turbine at predetermined wind conditions (for example at a certain wind speed over a certain period of time); an adaptive control system (ACS) control feature that reduces the output power of the wind turbine if turbulences above a threshold are determined at the wind turbine, wherein the turbulences may for example be determined based on measured wind speeds and a load model; a power boost (PB) control feature that increases the power output of the wind turbine by increasing the power limit of the wind turbine under predetermined wind conditions (it may for example increase the rotational speed of the rotor proportional to the increase in output power); a power curve update kit (PCUK) control feature that modifies a control function of the controller, in particular the pitch angle control, in dependence on hardware modifications installed on the wind turbine, in particular on the rotor blades; and a peak shaving feature that changes the operating curve using which the controller operates the wind turbine, the operating curve determining wind turbine settings, in particular rotor speed and pitch, in dependence on wind speed.

It should be clear that the embodiments are not limited to the above-described control features, but that additional or different control features available for the respective wind turbine can be employed with embodiments of the invention. Also, as new control features become available, these can be employed in the estimation of the optimal combination of control features as described herein.

These distinct control features are used in different wind turbines and have an impact on the remaining lifetime of the wind turbine (for example by decreasing the load on structural components of the wind turbine in certain situations) and on the energy production (for example by increasing or decreasing the energy production in certain situations). For example, the wind turbine may include at least the HWRT and ACS control features, or the HWRT and PB control features, or at least the HWRT and ACS and PB control features. The activation of a control feature may correspond to a certain operating mode of the wind turbine, i.e., the control feature may change the way in which the wind turbine is operated in a certain situation, which may for example depend on the current wind conditions or the like. Different activated control features may thus correspond to different operating modes of the wind turbine.

Estimating the optimization parameter may include at least estimating the remaining lifetime, wherein estimating the remaining lifetime includes estimating a failure rate for the wind turbine based on statistical data for the wind turbine and/or a wind turbine fleet (in particular for wind turbines of a model corresponding to that of the actual wind turbine) and performing a fatigue assessment for the wind turbine based on measurements made by sensors of the wind turbine and/or siting measurements (i.e. measurements taken at the site of the wind turbine, such as related to weather conditions, wind speeds and the like). By combining statistical failure rates with fatigue assessment when determining the remaining lifetime, an improved and more precise determination can be made that considers both, the individual specific wind turbine and the knowledge obtained from the whole population of the respective wind turbine model (via statistical failure rates). The statistical data may for example include data for a fleet of wind turbines of the same model as the wind turbine under consideration or for the same wind turbine component to be evaluated. In this way, information about the general behavior and failures of the wind turbine model or component can be obtained and considered in the remaining lifetime estimation. The remaining lifetime is derived by combining the statistical data with the fatigue assessment, e.g., by weighting lifetime estimations obtained from both methods.

Performing the fatigue assessment may include the providing of an aeroelastic model of the wind turbine and evaluating the fatigue loading of components of the wind turbine based on the aeroelastic model and wind turbine data received from the measurements. Additionally, or alternatively, a control model may be employed in the fatigue assessment which may model the operating curves of the wind turbine. Such method allows an efficient assessment of the current status of the wind turbines components fatigue structural damage. For example, a BHawC model of the wind turbine may be employed.

In other embodiments, no such model may be employed, and for example weather conditions and turbine data, in particular measurements by respective sensors on the wind turbine, may be employed for a basic fatigue assessment.

Performing the fatigue assessment may include the adjusting of the aeroelastic and/or control model of the wind turbine based on the control features activated in accordance with the combination of activation states associated with the respective optimization step. Accordingly, as the activated control feature(s) change how the wind turbine behaves in different environmental conditions, such as in high wind conditions or the like, the consideration of the impact of these changes within the framework of the wind turbine model may provide an efficient and accurate estimation of the remaining lifetime and/or energy production of the wind turbine for the respective combination of activation states.

In the first optimization step, the selection of the combination of activation states may be based on a predetermined impact of the two or more control features on remaining lifetime and/or energy production of the wind turbine. In embodiments, the estimation of the optimization parameter may perform a model based estimation of lifetime and/or energy production under consideration of control features that are activated in accordance with the selected combination of activation states, wherein a subsequent optimization step selects a different combination of activation states based on the predetermined impact. The different combination of activation states corresponds to at least one of (a) activating an additional control feature, (b) deactivating one of the control features activated in the previous optimization step, or (c) substituting an activated control feature by a different activated control feature. For example when maximizing lifetime, two control features associated with the highest predetermined lifetime increase may be selected in the first optimization step, and if this combination does not result in an estimated optimization parameter meeting the target, one of the control features may be substituted by a control features associated with the next largest lifetime increase, or such control feature may be activated in addition.

It should be clear that some of the control features may interact with each other or may overlap to a certain extent. Such interaction is considered by the aeroelastic/control model of the wind turbine used in the estimation.

Estimating the remaining lifetime of the wind turbine may include estimating the remaining lifetime for certain predetermined structural or mechanical components of the wind turbine. The lowest remaining lifetime estimated for such structural or mechanical component may then determine the remaining lifetime of the wind turbine. In particular, load carrying components of the wind turbine may be considered when estimating the remaining lifetime. The rotor blades, the hub, the tower, and the nacelle may at least be considered. A rotor bearing, blade bearings, a blade pitch drive, a yaw drive, a generator, a gearbox and other components of the wind turbine may be considered as well.

The remaining lifetime that is estimated for the wind turbine may in some embodiments be a remaining useful lifetime (RUL), which is the time until structural reserves of the wind turbine are consumed while maintaining the target safety level when operating the wind turbine. The method may further comprise activating the control features of the wind turbine in accordance with the determined optimal combination of activation states and operating the wind turbine with the activated control features. The wind turbine may thus be operated in a way in which the optimization target is achieved, in which for example the remaining lifetime is maximized, the energy production is maximized, or another optimization target is achieved. The 'combination of activation states' describes the activation state of the individual control features that are considered by the method and thus in the respective optimization step. For example, if three control features A, B and C are provided, a combination of activation states may be that control features A and B are "on", whereas control feature C is "off"; a different combination is that control features A and C are on, whereas control feature B is off. The activation states can thus be changed for each optimization step to assess the optimization parameter for the different combinations. The combination of activation states thus indicates which of the available control features are switched on and which are switched off.

According to a further embodiment of the invention, a controller for controlling the operation of a wind turbine is provided. The controller is configured to activate or deactivate each of two or more distinct control features of the wind turbine, each control feature changing the operating characteristic of the wind turbine and having an impact on lifetime and energy production of the wind turbine. The controller comprises a data processor and a memory coupled to the data processor. The memory stores control instructions which when executed by the data processor perform any of the methods described hereinabove or further below. The controller may in particular be configured to perform any of the above recited method steps and may accordingly have interfaces for interacting with any of the components described herein. It may for example be configured to receive data from the sensors disclosed herein, or may transmit respective control commands for operating the wind turbine in accordance with the determined optimal combination of activation states of the control features. By such controller, advantages similar to the ones outlined further above with respect to the method may be achieved.

In an embodiment, the controller is implemented by a wind turbine controller of the wind turbine. The wind turbine itself may thus determine the respective control strategy as outlined above. In other embodiments, the controller may be a wind farm controller coupled to the wind turbine or may be implemented by a combination of the wind turbine controller and a wind farm controller. Parts of the method may then be performed by each of these controllers. For example, the wind turbine controller may collect data from the turbine and transmit it to the wind farm controller, the user may select type of optimization parameter at the wind farm controller, the wind farm controller may determine the optimal combination of activation states and communicate it to the wind turbine controller, and the wind turbine controller may activate the respective control features in accordance with the determined and received combination of activation states.

According to a further embodiment of the invention, a wind turbine or a wind farm comprising such controller is provided.

According to an additional aspect a method for generating electrical energy by operating the wind turbine or wind farm is disclosed.

A further embodiment of the invention provides a computer program for controlling the operation of a wind turbine. The computer program comprises control instructions which, when executed by a data processor of a controller controlling the wind turbine, cause the data processor to perform any of the methods disclosed herein. Again, by such computer program, advantages similar to the ones outlined further above may be achieved. A data carrier comprising such control instructions is furthermore provided.

A further embodiment of the invention provides a computer program product for controlling the operation of a wind turbine. The computer program product comprises a computer readable hardware storage device having control instructions stored therein, wherein the control instructions when executed by a data processor of a controller controlling the wind turbine, cause the data processor to perform the methods disclosed herein.

It is to be understood that the features mentioned above and those yet to be explained below can be used not only in the respective combinations indicated, but also in other combinations or in isolation, without leaving the scope of the present invention. In particular, the features of the different aspects and embodiments of the invention can be combined with each other unless noted to the contrary.

BRIEF DESCRIPTION

Some of the embodiments will be described in detail, with reference to the following figures, wherein like designations denote like members, wherein:

FIG. 5 is a flow diagram illustrating a method of operating a wind turbine according to an embodiment of the invention.

DETAILED DESCRIPTION

Figure 1:
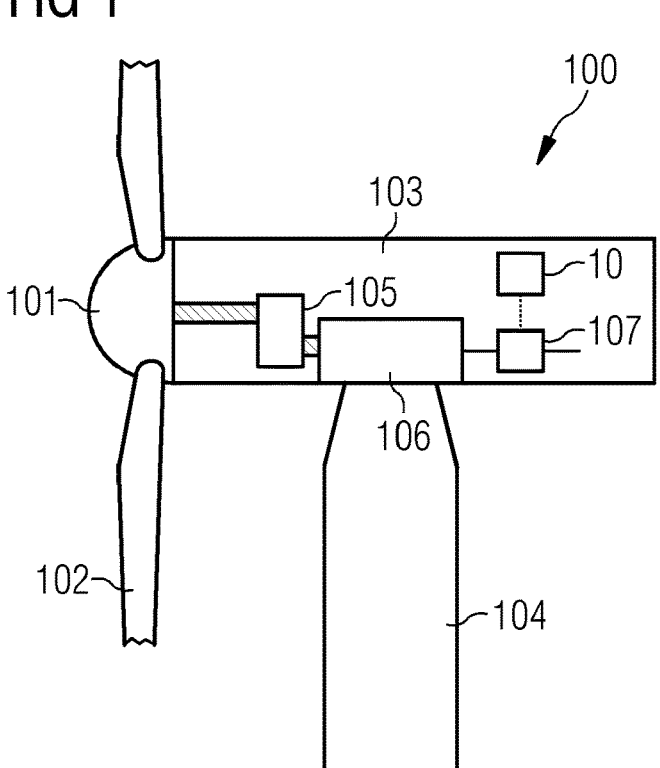
FIG. 1 is a schematic drawing showing a wind turbine including a controller according to an embodiment of the invention.

In the following, embodiments of the invention will be described in detail with reference to the accompanying drawings. It is to be understood that the following description of the embodiments is given only for the purpose of illustration and is not to be taken in a limiting sense. It should be noted that the drawings are to be regarded as being schematic representations only, and elements in the drawings are not necessarily to scale with each other. Rather, the representation of the various elements is chosen such that their function and general purpose become apparent to a person skilled in the art. As used herein, the singular forms "a," "an," and "the" are intended to include the plural forms as well, unless the context clearly indicates otherwise. The terms "comprising," "having," "including," and "containing" are to be construed as open-ended terms (i.e., meaning "including, but not limited to,") unless otherwise noted.

FIG. 1 schematically shows a wind turbine 100 that includes a rotor 101 with rotor blades 102. A nacelle 103 of the wind turbine 100 is mounted to a wind turbine tower 104 and is rotatable by a yaw drive (not shown). Wind turbine 100 furthermore includes a gear box 105, a generator 106 and a converter 107. In operation, wind energy is converted into rotational mechanical energy by the blades 102 of the rotor, wherein rotation of the rotor 101 turns the generator 106 which converts the mechanical energy into electrical energy. By means of the converter 107, the electrical energy can be converted to the desired AC-frequency, allowing an operation of the wind turbine 100 with variable speed. It should be clear that the wind turbine 100 may have a configuration different to the one shown in FIG. 1. For example, it may be a direct drive turbine that does not include a gear box 105. It may further employ a full converter solution or it may employ a doubly fed induction generator (DFIG), wherein the converter 107 is coupled to the rotor of such generator. Wind turbine 100 may further comprise a transformer (not shown), which may for example be located at a base of tower 104.

Furthermore, a controller 10 is provided that can fully or partially be implemented as a wind turbine controller, as shown in the example of FIG. 1. Such wind turbine controller controls components of the wind turbine 100. It may for example control the yaw angle of the nacelle 103 and the pitch angle of the blades 102. It may further control electrical components, such as the converter 107 and/or the generator 106. Controller 10 may further be configured to shut down the wind turbine 100 in certain conditions and to start up the wind turbine 100.

Controller 10 may implement one or a combination of several of the following control features. Controller 10 may for example implement a high wind ride-through (HWRT) control feature. Conventional wind turbines may be programmed to shut down if over a time interval of ten minutes, the mean wind speed exceeds 25 m/s. When the HWRT control feature is activated, the wind turbine does not shut down under such predefined conditions, but it employs a load-based reduction in the output power above a certain wind speed. For example, if the wind speed exceeds 23 m/s for a certain period of time, the rotational speed of the rotor and the power output of the wind turbine are gradually being reduced. For example, the pitch angle of the rotor blades 102 may be modified so that less wind energy is being converted. HWRT accordingly performs a load based reduction of the output power of the wind turbine at predetermined wind conditions. A further control feature implemented by the controller 10 may be an adaptive control system (ACS) control feature. If relatively strong turbulences are present in the air impinging on the wind turbine, overloading of the wind power system may occur and as well as overly fatigue of material. Conventional control systems may shut down the wind turbine to prevent such overload conditions. By employing the ACS control feature, turbulences are detected at the wind turbine. If turbulences above a certain threshold are detected, the controller reduces the output power of the wind turbine. Thereby, the fatigue load on the wind turbine can be reduced. If the turbulences in the airflow are reduced again, the output power can be ramped up again to the former value.

The controller 10 may for example implement an ACS controller that uses a load model to determine the occurrence of respective turbulences that may cause overloading of the wind turbine. The ACS control feature thus effectively prevents the shutdown of the wind turbine in such situations by reducing the output power of the wind turbine if turbulences above such threshold are detected at the wind turbine. The ACS control feature may thus be based on respective measured wind speeds and a respective load model. The ACS feature is in particular useful in wind farms where a dense population of wind turbines may increase the turbulences in the airflow.

A further control feature that the controller 10 may implement is a power boost (PB) control feature. The power boost control feature increases the energy production of the wind turbine by increasing a power limit under predetermined conditions. The wind turbine may for example operate at a limit of output power, yet the operation may occur below the load limit for structural loads of the wind turbine. The PB feature increases in such situations the rotational speed of the rotor proportional to the increase in output power. The net power production may be increased by up to 5% by such measure.

A further control feature that may be implemented by the controller 10 is a turbine load control (TLC) control feature. The controller 10 may implement a turbine load control system that continuously monitors the structural loading on the wind turbine. If normal operating values are exceeded by the measured loads, the controller may automatically regulate the operation of the wind turbine to bring the loads back into the design envelope. It may for example reduce the rotational speed of the rotor by a respective pitching of the rotor blades.

A further control feature that the controller 10 may implement is a power curve upgrade kit (PCUK) control feature. After deployment, hardware upgrades may be installed on the wind turbine, for example aerodynamic improvements to the blades, such as flaps mounted to the trailing edge of the blade root to increase lift or flaps with serrated edges mounted to the trailing edge of the blade tip to enhance lift by extending the blade chord. The PCUK control feature modifies the wind turbine control to account for such hardware modifications and to enhance energy production, for example by adjusting the pitch control.

It should be clear that the wind turbine 100 and the controller 10 may implement further control features that can be used to adapt the operation of the wind turbine 100 to the prevailing conditions. Such control features may be used to increase the energy production by the wind turbine, to reduce the fatigue loading on components of the wind turbine, to implement safety measures and the like. Control features within the meaning of the present disclosure are control features that have an impact on the lifetime and/or the energy production of the wind turbine 100, and that are dedicated features that can be activated or deactivated by the controller 10. Controller 10 can accordingly control the wind turbine 100 to operate with one or more of the above-mentioned control features turned on or turned off. Wind turbine 100 is thus generally operated with a certain combination of these control features being active. It should be clear that the wind turbine 100 may not implement all of the above recited control features but may implement only some of them. Any combination of two or more of the above recited control features may be implemented by the controller 10 and the wind turbine 100. An impact on the lifetime or energy production of the wind turbine means that activation of the respective control feature changes the remaining lifetime and/or changes the energy production (annual production or production over the remaining lifetime) by the wind turbine.

Conventionally, the overall impact that the activation or deactivation of such control features has on the performance and failure risk of the wind turbine is not considered. A structural feature of a wind turbine may be assessed through physical inspection, and it may be determined if a specific control feature is to be turned on or turned off. The overall actual failure risk of the wind turbine and in particular the impact of the combination of control features is not considered. Furthermore, this is a manual process in conventional systems.

The controller 10 is configured to determine an optimal combination of activation states of the available control features that achieves an optimization target. In particular, the user only needs to determine the quantity (type of optimization parameter) that he would like to optimize, and the controller 10 automatically determines the control parameters to achieve a respective control, in particular the activation states of the control functions that achieve the desired optimization. If the user selects for example the wind turbine's remaining lifetime as the type of optimization parameter, wherein maximization thereof is an associated optimization target, then the controller 10 automatically determines a combination of activation states of the control features that maximizes the wind turbine's lifetime. Likewise, if the type of optimization parameter is energy pro-
duction, and the optimization target is maximization thereof,
the controller 10 determines a combination of activation
states that provides a maximum energy output from the wind
turbine and controls the wind turbine 10 accordingly, in
particular by activation/deactivation of the 10 respective
control features in accordance with the determined combi-
nation.

Figure 2:
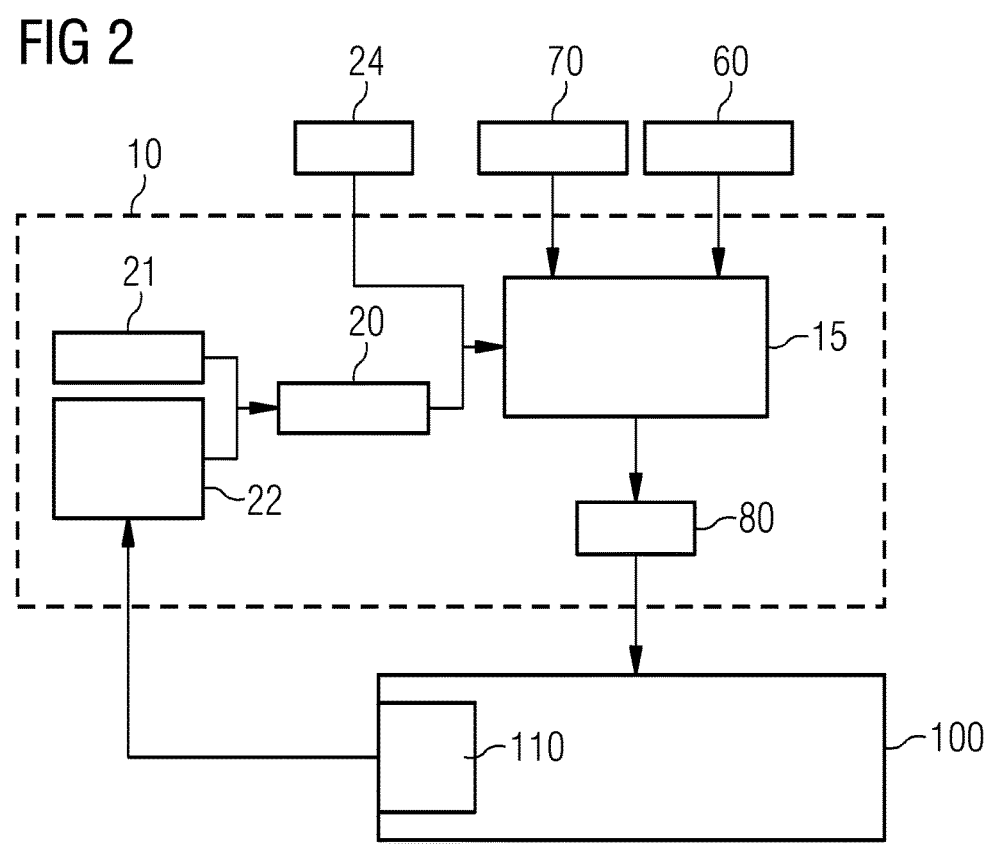
FIG. 2 is a schematic drawing showing functional components of a controller according to an embodiment of the invention.

FIG. 2 is a functional diagram of the controller 10 that
illustrates different functions implemented by the controller
10 and different data used by the controller 10. The con-
troller 10 in particular implements a wind turbine manage-
ment unit 15 that performs the determination of the optimal
combination of activation states of the control features and
thus an optimum control strategy 80. For determining the
remaining lifetime of the wind turbine, the controller 10 can
employ both, a fatigue assessment provided by a fatigue
assessment unit 20 and statistical data 24 on the failure rates
of respective wind turbines. The failure rates comprised in
the statistical data 24 may for example be derived from
respective statistical data from a whole fleet of wind turbines
of the same model, or for the same component of respective
wind turbines. A statistical model may be used to derive
respective failure rates. The statistical data 24 may be
provided in a memory of the controller 10, or the controller
10 may obtain the statistical data 24 via a data connection,
such as a network connection to a server, or from a data
carrier which an operator may for example couple to the
controller 10. By employing the statistical data 24, infor-
mation about the general behavior and failures of the respec-
tive wind turbine model or component can be processed and
employed in the remaining lifetime estimation.

The fatigue assessment (unit 20) employs a model 21,
which is in particular and aeroelastic and/or control model.
In an embodiment, at least an aeroelastic model is employed.
The model 21 of the wind turbine may for example be a
BHawC model. Furthermore, wind turbine data 22 is
obtained and is employed in the fatigue assessment. Wind
turbine data 22 can include data from different data sources
on the wind turbine or from associated sensors, such as from
wind sensors, accelerometers, air density sensors, tempera-
ture sensors and other data relevant for the operation and in
particular for the loading of the wind turbine 100; it may
further include data internal to the wind turbine, such as
rotor speed, torque, and the like. The wind turbine data 21
comprises data from turbine sensors that is gathered by the
controller 10 or known to the controller 10. Information
about the operation of the specific wind turbine 100 can thus
be obtained and processed.

The model 21 is used together with the wind turbine data
22 to assess the current status of the wind turbine's com-
ponents fatigue structural damage. In particular, it can be
assessed for different structural components of the wind
turbine what their fatigue loading and what their remaining
lifetime is. For example, for a component having a particular
type of material, a certain number of loading cycles can be
performed over the lifetime of this structural component.
The loading of this component is calculated using the
structural dynamics model 21 of the wind turbine with the
environmental conditions and loading measured in the data
22 as an input. The remaining lifetimes estimated for the
structural components may form the basis for determining
the remaining lifetime of the wind turbine 100. A respective
fatigue assessment is performed by unit 20.

The wind turbine management unit 15 estimates the
remaining lifetime of the wind turbine 100 based on the
fatigue assessment performed by unit 20 and the statistical data 24. For example, the management unit 15 may combine
a remaining lifetime estimate that is based on the fatigue
assessment 20 and a remaining lifetime estimate that is
based on the statistical data 24 for the respective type and
model of wind turbine by weighting the different values to
obtain an overall remaining lifetime estimate. The weights
may be higher for the fatigue assessment 20, as it reflects the
actual status of the wind turbine. As an example, the fatigue
assessment 20 may contribute 60% and the statistical data 24
may contribute 40% to a total remaining lifetime estimate,
but other ways to combine the estimates are conceivable.
The weights may be selected on the basis of the model
employed, and they may be preset by a wind turbine
manufacturer. They may be adjustable in dependence on the
experience with the respective wind turbine model, e.g., by
the manufacturer or an operator.

Based on the known control curves for the wind turbine
and the average wind conditions for the year, the wind
turbine management unit 15 further estimates the energy
production of the wind turbine over a year (annual energy
production, AEP), or for the remaining lifetime of the wind
turbine.

A user interface 60 is furthermore coupled to the control-
ler 10. Via the user interface 60, an operator can select a type
of optimization parameter in accordance with which the
operation of the wind turbine should be optimized. Such
optimization parameter may be associated with an optimi-
zation target, or an optimization target may also be entered
by the operator via user interface 60. Furthermore, the
controller 10 may receive additional information in form of
external parameters 70 that are relevant for the operation of
the wind turbine and that may form the basis for operating
the wind turbine. As an example, such external parameters
may include data related to energy demand, for example of
a power grid to which the wind turbine is connected,
indicating when the demand for electric power is high or
low. Exemplary optimization parameters and targets include
the maximization of the energy production (e.g. the annual
energy production or the energy production over the remain-
ing lifetime); maximization of the remaining lifetime; mini-
mization of the fatigue loading; maximizing power demand
satisfaction; and maximizing the useful energy production,
e.g. by prioritizing power production when the power
demand of the grid is high and prioritizing lifetime when
power demand is low (which may be determined by respec-
tive power demand thresholds).

The wind turbine management unit 15 then performs an
optimization method, an example of which is described
further below with respect to FIG. 6, for determining which
control features provided by the controller 10 should be
activated in order to best meet the optimization target, i.e.,
it determines a combination of activation states for the
available control features. In accordance with the resulting
optimal combination of activation states 80, the controller
10 then controls the wind turbine 100. In particular, in
accordance with the determined combination, the controller
10 activates the respective control features during operation
of wind turbine 100. The wind turbine includes the condi-
tion-monitoring system 110, which may include sensors
monitoring the condition of the respective wind turbine
components for determining the remaining lifetime. Infor-
mation from the condition-monitoring system 110 can be
provided as feedback and used in the turbine data 22 and
may in particular be used to confirm the desired impact on
wind turbine lifetime of the respective control strategy 80. If
the change in remaining lifetime as anticipated for an
operation with the optimal combination of activation states is not achieved, the control strategy 80 may be revised by unit 15 taking into account the lifetime impact determined by the condition-monitoring system 110. It should be clear that the impact on the fatigue of wind turbine components is generally observable only after prolonged times of wind turbine operation (months or years), whereas short-term events are less likely to impact the fatigue assessment.

Figure 3:
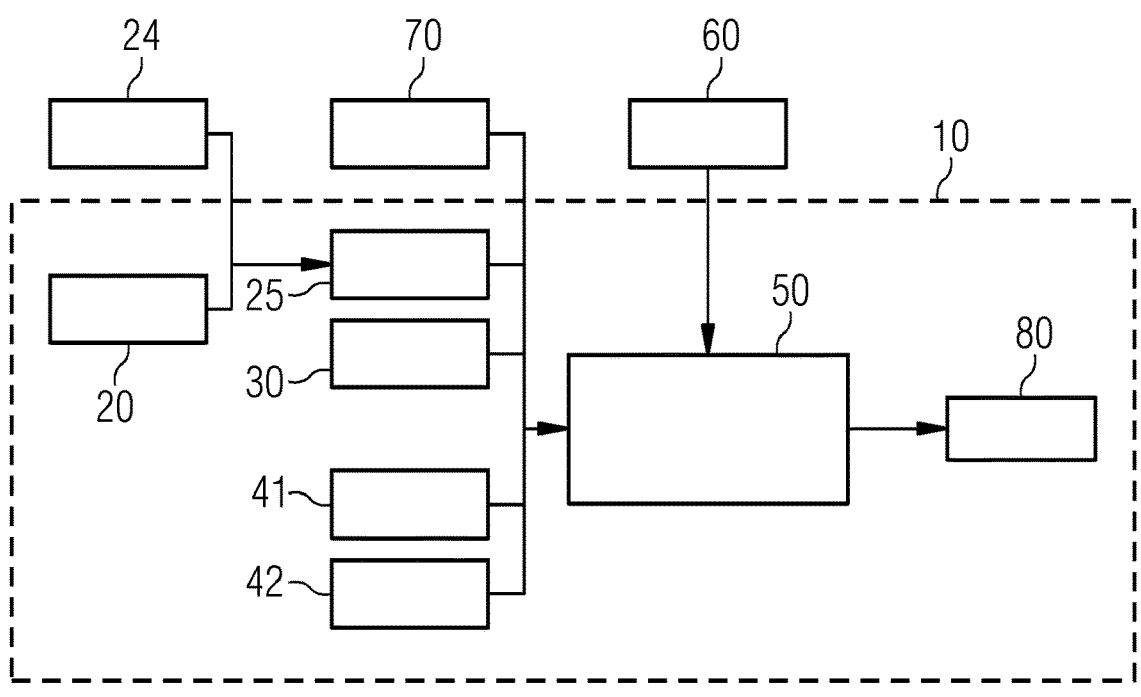
FIG. 3 is a schematic drawing showing functional components of a controller according to an embodiment of the invention.

FIG. 3 shows in more detail how the controller 10 determines the optimum control strategy 80 in form of the optimal combination of activation states of the control features. A flow diagram showing a respective method is illustrated in FIG. 5. Via the user interface 60, the controller 10 receives a user selection of the type of optimization parameter (step 501) associated with a respective optimization target, such as lifetime maximization, energy production maximization or maximizing the useful energy delivery (step 502). Other optimization targets are a predetermined change in the remaining lifetime or energy production, e.g., an increase of 5%, 10% or the like. Controller 10 then obtains the statistical data on failure rates for the respective wind turbine model (step 503), wherein the statistical data 24 may be stored in a memory of controller 10 or may obtained via a data link. Controller 10 furthermore obtains the turbine data 22 in step 504 and uses the aeroelastic and control model 21 to perform a fatigue assessment on the basis of this data (step 505; fatigue assessment unit 20). The remaining lifetime estimation unit 25 then estimates a remaining lifetime of the wind turbine based on the statistical data 24 and the fatigue assessment 20 (step 506). As mentioned above, the fatigue assessment and the statistical data may for example be combined by weighting respectively determined lifetime estimates.

The energy production estimation unit 30 furthermore estimates the baseline energy production of the wind turbine per year (AEP) or for the remaining lifetime (step 507). The controller 10 further has available data 41 indicating the impact of the available control features on lifetime, and data 42 indicating the impact of the available control features on energy production. Such data may for example indicate that a control feature A has a predetermined impact on +3 years on lifetime and −3% on annual energy production (AEP). Another control feature B may for example have a predetermined impact of −6 years on lifetime and +4% on AEP. These are predetermined impact values that may not reflect the actual impact that the control features have for the individual wind turbine, in particular when combining different control features. The strategy optimization unit 50 now performs an optimization method including one or more optimization steps (step 508 in FIG. 5) that determines an optimal combination of activation states that meets the optimization target for the user selected optimization parameter, i.e., it determines which of the available control features should be activated in order to achieve the optimization target.

Figure 6:
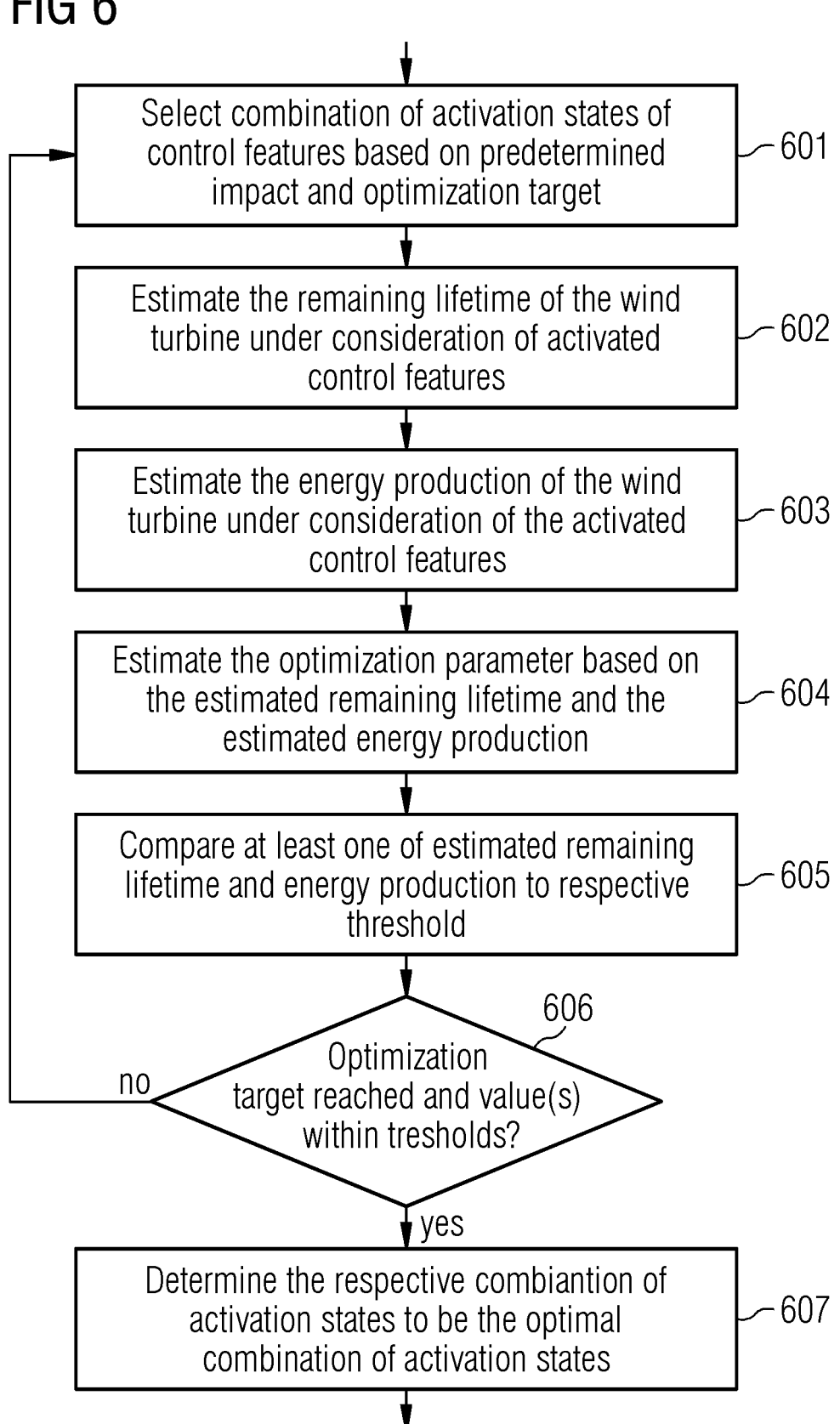
FIG. 6 is a flow diagram illustrating a method of determining an optimal set of activation states of wind turbine control features according to an embodiment of the invention.

An example of such optimization method is shown in the flow diagram of FIG. 6. In step 601, a combination of activation states of the available control features is selected on the basis of the predetermined impact of these control features on lifetime and performance (energy production) based on the data 41 and 42 and on the optimization target. For example, if the user selects lifetime maximization as optimization parameter and target, the optimization unit 50 will select the active state for control features that increase the wind turbine's lifetime, for example the above indicated feature A, wherein feature B is set as inactive in the combination of activation states. In steps 602 and 603, the 'real' remaining lifetime and the energy production of the wind turbine are estimated as outlined above under consideration of the control features that are activated in accordance with the selection in step 601, i.e., with an activated feature A. This may be performed by the units 25 and 30 based on the model 21 (which is adjusted in accordance with the activated features), and the data 22 and 24. As an example, the activated control feature may reduce the loading on a structural component in the fatigue assessment 20, yet may result in a reduction in the energy production when estimating the wind turbine performance by unit 30. Using the adapted estimations, the optimization parameter is estimated in step 604, which is the total remaining lifetime in the present example. In embodiments, at least the remaining lifetime and the annual or remaining energy production of the wind turbine are estimated in step 604. Again, it should be clear that other optimization parameters may be chosen, such as a maximization of the total power delivery which takes into account both the remaining lifetime over which power can be delivered and the annual energy production.

In step 605, one or more boundary conditions are evaluated. For example, the estimated remaining lifetime and/or the estimated energy production are compared to respective thresholds, for example to determine if the change in the respective quantity exceeds a respective threshold. As an example, a threshold may be set that the activation of control features should not lead to a reduction of the AEP of more than 5%. If the maximization of AEP is the optimization target, then a suitable threshold may be that the activation of the control features should not result in a decrease of the remaining lifetime of more than 5 years. Such thresholds may be preset thresholds or may be defined by the operator by using the user interface 60, or by a wind turbine manufacturer.

In step 606, it is determined if the optimization target is reached and if the boundary conditions are met, i.e., if the value of remaining lifetime or energy production is within the respective threshold. As an example, besides the above-mentioned control feature A, a further control feature that should generally increase the remaining lifetime of the wind turbine may be available. Yet due to the interaction between both control features, the desired lifetime increase may not be achieved, and the control features may negate themselves partially. Accordingly, for such combination, the optimization target may not be reached. The optimization target may for example be defined as predefined increase in lifetime, or a predefined increase in energy production. Likewise, the determined combination of activation states may lead to a change in the remaining lifetime or energy production that exceeds a respective threshold, i.e., a too large reduction in remaining lifetime or a too large reduction in energy production (boundary condition not met).

Accordingly, if the optimization target is not reached or if the boundary condition is not met, a different combination of activation states is selected in step 601, wherein the selection may again be based on the available data 41, 42. Otherwise, the respective combination of activation states determined in step 601 is taken as the optimal combination of activation states in step 607. This optimal combination of activation states (optimal strategy 80) is given out by the strategy optimization unit 50 and is used by the controller 10 to control the wind turbine 100. For example, a further control feature B has an impact on lifetime of −6 years and an impact on energy production of +4% AEP, and the optimization target is a maximization of the energy production. Feature B may be selected as active in step 601 by the strategy optimization unit 50. However, it may be determined by the evaluation in steps 602 to 604 and the comparison in step 605 that the reduction in lifetime is too high, and the method may revert in step 606 to step 601 to select a different feature combination, for example by adding a control feature that improves the wind turbine's lifetime yet has only a slight negative impact on energy production. It should be clear that the interaction between these control features is not known in advance and is realistically estimated in steps 602 to 604 by making i.e., use of model 21 to thereby determine the optimal control strategy for reaching the optimization target.

Figure 4:
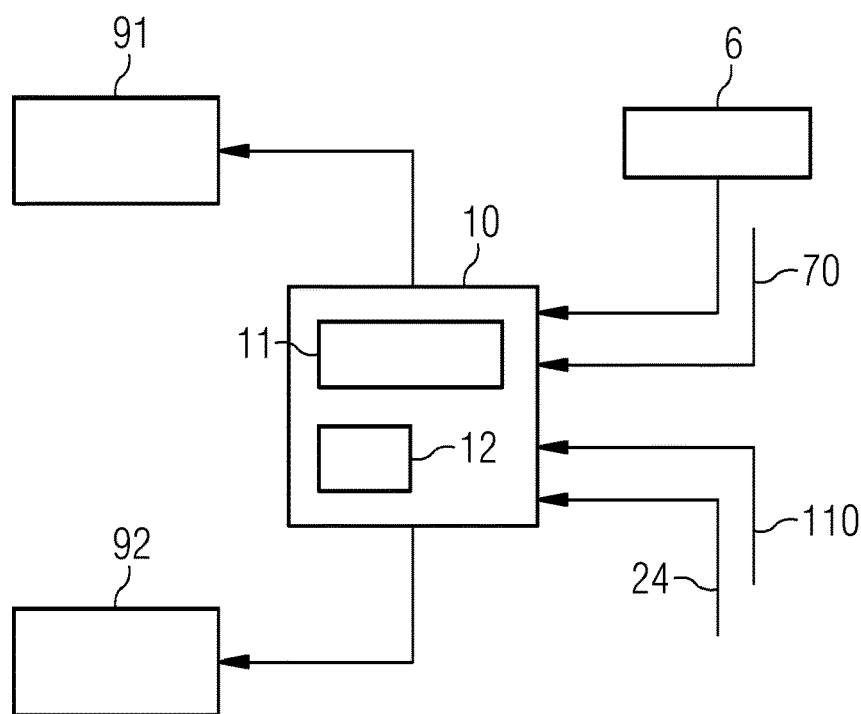
FIG. 4 is a schematic drawing showing a controller and controlled components according to an embodiment of the invention.

It should be clear that the above-described optimization method performed in step 508 of FIG. 5 is only one example, and that other optimization methods may be employed as well. As an example, a search algorithm may be employed that performs a search through all or a subset of possible combinations of activation states to find the combination that both best meets the optimization target and that meets the boundary conditions. The optimization target is then reached in step 606 if the search algorithm encounters a stop condition, such as arriving at a combination that meets the optimization target. Another example is that the optimization method performs the optimization steps 601 to 605 for all possible combinations of activation states and then selects the combination of activation states for which the boundary conditions are met while the optimization parameter best complies with the optimization target. The optimization target is thus reached in step 606 after all possible combinations of activations states have been tested. In the method of FIG. 5, the estimation steps 506 and 507 and the respective preceding steps may be performed as part of the optimization method 508 and may not be performed in addition and in advance. Likewise, the units 25 and 30 may form part of the strategy optimization unit 50. FIG. 4 illustrates an exemplary implementation of the controller 10. The controller 10 includes a processor 11 and a memory 12. The processor 11 may be any type of processor, such as a microprocessor, an application specific integrated circuit, a digital signal processor or the like.

Memory 12 may include volatile and non-volatile memory, in particular RAM, ROM, FLASH-memory, hard disc drives and the like. Controller 10 includes input and output interfaces for receiving data and for transmitting control data and control commands to components of the wind turbine. Such communication may be performed wirelessly or via respective wires, such as a control bus or the like. The controller may include the user interface 60 (e.g., including a display and an input device) via which user input from an operator of the wind turbine can be received. Controller 10 furthermore receives the statistical data 24, the external parameters 70 and the data from the condition-monitoring system 110, as well as from other sensors of the wind turbine. In accordance with the determined control strategy, i.e., the optimal combination of activation states of the control features, the controller 10 provides control signals to control mechanical components 91 and electrical components 92 of the wind turbine. As an example, the controller 10 may adjust the pitch angle of the wind turbine blades, may control the yaw angle, may control a braking system, or the like. On the electrical side, the controller 10 may for example control the converter 107 of the wind turbine and/or the generator 106 to control the torque applied to the rotor 101 to thereby control the rotational speed and the mechanical loading. Any known control method of the wind turbine 100 may be employed and implemented by controller 10.

It should be clear that the different features and embodiments described herein can be combined and can all be implemented by the controller 10. The controller 10 may be implemented fully or partially by a wind turbine controller or a wind farm controller. When implemented as a wind turbine controller according to embodiments, the controller can within the wind turbine determine the optimum control strategy for the respective wind turbine in dependence on the optimization target and can control the wind turbine accordingly. On the other hand, when implemented as a wind farm controller according to embodiments, the controller may evaluate the respective operating parameters individually for each of the different wind turbines of the wind farm and may then determine an optimum control strategy individually for each wind turbine of the wind farm. It may then provide respective control parameters to the individual wind turbine controllers, such as torque set points, rotational speed set points and the like, or it may instruct the individual wind turbine controllers to turn on or off the respective control features in accordance with the determined control strategy 80 for the respective wind turbine. The operator may then input the optimization parameter/target for the wind farm so that all wind turbines can be controlled in accordance with such target. It should be clear that in other implementations, the controller 10 is partly implemented by such wind turbine controller and by such wind farm controller, and the functions may be distributed between the controllers, for example by receiving the user input at the wind farm controller and by determining the optimal control strategy at the individual wind turbine controllers. Other implementations are certainly conceivable.

The above disclosed embodiments accordingly allow an optimization of the operation of the wind turbine that is performed automatically and that only requires the user to input the optimization target. The operator may for example specify a maximum lifetime strategy, and the controller automatically selects a combination of control features that gives the maximum lifetime for the wind turbine, while considering respective boundary conditions for other operating parameters (that are different from the optimization parameter). Similarly, the operator may select a maximum performance target and the controller may determine a combination of control features that provides a maximum energy production of the wind turbine. The yearly energy production or the energy production over the remaining lifetime of the wind turbine may for example be maximized. Furthermore, by considering both, the fatigue assessment and the statistical data in the lifetime estimation, a very accurate estimate of the remaining lifetime is achieved.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of operating a wind turbine using a controller, wherein the controller is configured to activate or deactivate each of two or more distinct control features of the wind turbine, each control feature changing the operating characteristic of the wind turbine and having an impact on at least one of lifetime and energy production of the wind turbine, wherein the method comprises:

determining a type of optimization parameter and an optimization target for the optimization parameter, wherein the optimization parameter is related to at least one of (a) lifetime of the wind turbine, (b) energy production of the wind turbine, and (c) power demand satisfaction for a power demand from a power grid to which the wind turbine is connected;

performing one or more optimization steps, wherein each optimization step is performed for a different combination of activation states of the two or more control features, wherein the two or more control features comprise at least two or all of the control features selected from the group consisting of:

a high wind ride through, HWRT, control feature that performs a load-based reduction of the output power of the wind turbine at predetermined wind conditions;

an adaptive control system, ACS, control feature that reduces the output power of the wind turbine if turbulences above a threshold are determined at the wind turbine;

a power boost, PB, control feature that increases the power output of the wind turbine by increasing the power limit of the wind turbine under predetermined wind conditions;

a power curve upgrade kit, PCUK, control feature that modifies a control function of the controller in dependence on hardware modifications installed on the wind turbine; and a peak shaving feature that changes the operating curve using which the controller operates the wind turbine, the operating curve determining wind turbine settings in dependence on wind speed, wherein each optimization step includes:

selecting a combination of activation states of the two or more control features;

estimating the optimization parameter, the estimating including at least the estimation of the remaining lifetime if the optimization parameter is related to the lifetime of the wind turbine, and the estimating including at least the estimation of the energy production of the wind turbine if the optimization parameter is related to the energy production of the wind turbine or to the power demand satisfaction, wherein the estimating considers the impact of the control features activated in the optimization step;

based on the estimated optimization parameter, determining if a further optimization step is to be performed;

wherein the method further comprises:

based on the one or more optimization steps, determining an optimal combination of activation states of the two or more control features for which the estimated optimization parameter meets the optimization target, the optimal combination of activation states being automatically determined by the controller, and activating the control features of the wind turbine in accordance with the determined optimal combination of activation states and operating the wind turbine with the activated control features.

2. The method according to claim 1, wherein the type of optimization parameter is selected from at least two types of possible optimization parameters including at least two of: energy production, remaining lifetime, and useful energy production, wherein useful energy production is associated with an optimization target of maximizing energy production when a power demand from the grid is above a threshold and maximizing remaining lifetime when a power demand from the grid is below a threshold.

3. The method according to claim 2, wherein determining the type of optimization parameter comprises receiving a user input for selecting the type of optimization parameter from the at least two types of possible optimization parameters.

4. The method according to claim 1, wherein the selection of the combination of activation states of the two or more control features is based on a predefined impact of the two or more control features on remaining lifetime and/or energy production of the wind turbine.

5. The method according to claim 1, wherein determining if a further optimization step is to be performed comprises evaluating one or more boundary conditions.

6. The method according to claim 5, wherein evaluating a boundary condition comprises determining if the change in remaining lifetime and/or energy production of the wind turbine caused by the activation of the control features in accordance with the respective combination of activation states exceeds a respective threshold, and/or determining if the total remaining lifetime exceeds a predetermined time period threshold.

7. The method according to claim 1, wherein performing the one or more optimization steps includes performing a search algorithm or optimization algorithm for finding the combination of activation states that results in an optimization parameter best meeting the optimization target, wherein the combination of activation states found by the algorithm is selected as the optimal combination of activation states.

8. The method according to claim 1, wherein estimating the optimization parameter includes at least estimating the remaining lifetime, wherein estimating the remaining lifetime includes estimating a failure rate for the wind turbine based on statistical data for the wind turbine and/or a wind turbine fleet and performing a fatigue assessment for the wind turbine based on measurements made by sensors of the wind turbine and/or siting measurements.

9. The method according to claim 8, wherein performing the fatigue assessment includes the providing of an aeroelastic model of the wind turbine and evaluating the fatigue loading of components of the wind turbine based on the aeroelastic model and wind turbine data received from the measurements.

10. The method according to claim 9, wherein the performing of the fatigue assessment includes adjusting of the aeroelastic model of the wind turbine based on the control features activated in accordance with the combination of activation states associated with the respective optimization step.

11. The method according to claim 1, wherein in a first optimization step, the selection of the combination of activation states is based on a predetermined impact of the two or more control features on remaining lifetime and/or energy production of the wind turbine, wherein the estimation of the optimization parameter performs a model based estimation of remaining lifetime and/or energy production under consideration of control features that are activated in accordance with the selected combination of activation states, wherein a subsequent optimization step selects a different combination of activation states based on the predetermined impact, wherein the different combination corresponds to at least one of activating an additional control feature, deactivating one of the control features activated in a previous optimization step, or substituting an activated control feature by a different activated control feature.

12. The method according to claim 1, wherein estimating the remaining lifetime of the wind turbine includes estimating the remaining lifetime for predetermined structural or mechanical components of the wind turbine, wherein the lowest remaining lifetime estimated for the structural or mechanical components determines the remaining lifetime of the wind turbine.

13. A controller, comprising:

a data processor and a memory coupled to the data processor, the memory storing control instructions which when executed by the data processor perform the method of claim 1.

14. The controller according to claim 13, wherein the controller is implemented by a wind turbine controller of the wind turbine, by a wind farm controller coupled to the wind turbine, or by a combination of the wind turbine controller and the wind farm controller.

15. A wind turbine comprising a rotor having rotor blades, a nacelle rotatably mounted to a wind turbine tower, a generator for generating electrical energy, and the controller according to claim 13.

16. A computer program product for controlling the operation of a wind turbine, wherein the computer program product comprises a non-transitory computer readable hardware storage device having control instructions stored therein, wherein the control instructions when executed by a data processor of a controller controlling the wind turbine, cause the data processor to perform the method of claim 1.

17. A method for generating electrical energy comprising:

performing the method of claim 1;

converting wind energy into rotational mechanical energy by rotor blades of the wind turbine; turning a generator by rotating a rotor of the wind turbine; and converting rotational mechanical energy into electrical energy.

* * * * *